United States Patent [19]

Pagani

[11] Patent Number: 4,747,915

[45] Date of Patent: May 31, 1988

[54] FALLING-FILM PROCESS FOR THE COCURRENT EVAPORATION OF A SOLUTION

[75] Inventor: Giorgio Pagani, Milan, Italy

[73] Assignee: Montedison S.p.A., Milan, Italy

[21] Appl. No.: 837,656

[22] Filed: Mar. 6, 1986

Related U.S. Application Data

[63] Continuation of Ser. No. 629,422, Jul. 10, 1984, abandoned.

[30] Foreign Application Priority Data

Jul. 18, 1983 [IT] Italy ................................ 22103 A/83

[51] Int. Cl.⁴ .......................... B01D 1/22; B01D 3/00
[52] U.S. Cl. .................................... 203/89; 159/13.1; 159/47.2; 159/49; 159/DIG. 10; 202/236; 165/115; 564/73
[58] Field of Search ................... 203/89; 202/236; 159/49, 47.2, 13.1, 27.4, DIG. 10, 27.1, 28.3, 43.1; 564/73, 67; 165/115

[56] References Cited

U.S. PATENT DOCUMENTS

| | | | |
|---|---|---|---|
| 28,524 | 8/1875 | Brebant | 202/175 |
| 1,004,087 | 9/1911 | Scheinemann | 159/27.4 |
| 2,224,025 | 12/1940 | Sondermann | 202/175 |
| 2,701,262 | 2/1955 | Cook | 159/47.2 |
| 3,087,533 | 4/1963 | Graumann et al. | 159/49 |
| 3,147,174 | 9/1964 | Cook | 159/47.2 |
| 3,405,689 | 10/1968 | Peterson | 159/13 A |
| 3,491,821 | 1/1970 | Graumann et al. | 159/49 |
| 3,505,111 | 4/1970 | Malek | 159/4.01 |
| 3,514,484 | 5/1970 | Wentworth | 260/555 |
| 3,822,192 | 7/1974 | Brown | 159/16 R |
| 4,094,734 | 6/1978 | Henderson | 159/49 |
| 4,135,567 | 1/1979 | Mattern | 159/49 |
| 4,217,176 | 8/1980 | Antony | 159/47.3 |
| 4,316,767 | 2/1982 | Saida et al. | 159/49 |
| 4,317,787 | 3/1982 | Lagana | 261/112 |
| 4,321,410 | 3/1982 | Ono et al. | 564/67 |
| 4,422,899 | 12/1983 | Vuhola et al. | 159/49 |
| 4,427,053 | 1/1924 | Klaren | 159/49 |

FOREIGN PATENT DOCUMENTS 0723344 2/1955 United Kingdom ............... 159/27.4

Primary Examiner—S. Leon Bashore
Assistant Examiner—V. Manoharan
Attorney, Agent, or Firm—Stevens, Davis, Miller & Mosher

[57] ABSTRACT

A falling-film process and apparatus for the cocurrent evaporation of a solution is disclosed. The process utilizes a tube-bundle heat exchanger in which the upper ends of the individual tubes of the tube-bundle are closed. Apertures, preferably in the form of slots, are formed adjacent the closed-end of the individual tubes. A liquid heel is maintained above the highest of said apertures and flows into the interior of the tubes through said apertures. Upon entering the tubes the liquid and any vapor released therefrom flows cocurrently in a downward direction. The vapors released from the liquid are recycled to a point above the liquid heel through conduit means separate from the individual tubes.

9 Claims, 2 Drawing Sheets

FALLING-FILM PROCESS FOR THE COCURRENT EVAPORATION OF A SOLUTION

This is a continuation of application Ser. No. 629,422, filed July 10, 1984 and now abandoned.

BACKGROUND OF THE INVENTION

Falling-film evaporation is a quite common operation, exploited for various purposes; one example being the evaporation of essential oils, in order to separate the active components (from certain terpenic impurities) or the concentration of $(NH_4)NO_3$ solutions; another example being distillation of urea solutions.

A process for the synthesis of urea (I.D.R. process) is described, for instance, in U.S. Pat. No. 4,208,347 and in Italian patent publication No. 22073 A/83. Said patents state clearly that if one wants to reach high conversion yields for the reaction:

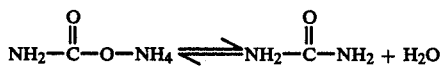

one shall use, within the reactor, $NH_3:CO_2$ molar ratios much higher than 2; therefore the $NH_3$ excess, which is present within the synthesis solution (together with the non reacted carbamate), has to be displaced, after the reaction, from the urea solution, usually by means of one or more strippers, whereto heat is supplied, optionally together with the injection of a gaseous stripping agent (coadjuvant), like $CO_2$ or $N_2$, and in subsequent steps, frequently isobaric with the synthesis reactor.

The resulting stripped vapors are recycled as such, or condensed in the presence of suitable amounts of water, the solution thus obtained being then recycled to the reactor. After a first high-pressure loop (frequently isobaric with the synthesis) there is a second, and final, low-pressure loop, the so-called "finishing", where the working pressures are very low and where the task is to remove from the solutions, in the vapor phase and as completely as possible, the $CO_2$ and the $NH_3$ not bound in the form of an urea molecule ($CO_2$ being present, e.g., as ammonium carbamate or carbonate). Usually said "non-bound" $NH_3$ is in strong excess with respect to the "non-bound" $CO_2$ and with respect to the stoichiometry of ammonium carbamate ($NH_3/CO_2=0.77$ b.w. namely 2:1 by moles)), and the recovery of $NH_3$ (from the vapors released by the solutions) requires a huge amount of water, which water is necessarily recycled to the synthesis reactor, where an increase of the $H_2O/CO_2$ ratio heavily impairs the conversion yields.

It is known that said $NH_3$ excess (with respect to the carbamate stoichiometry) can only be removed with much more difficulty than the $NH_3$ and the $CO_2$ chemically bound in the form of carbamate; therefore an $NH_3:CO_2$ ratio of 0.77 b.w., namely a 2:1 ratio by moles, would represent an optimum and desirable choice, independent of the amounts of carbamate, the removal of which carbamate being notoriously a problem far easier to solve.

In other words, especially at the highest pressures (frequently coinciding with the synthesis pressure), it is desirable to suppress nearly completely said $NH_3$ excess and to keep said ratio near to the optimum level (0.77 b.w.), while committing the "finishing" the easy task to remove the residual carbamate, whatever the amount. Such a suppression is particularly difficult when the stripping is performed without the help of gaseous stripping agents from outside; in such a case, in fact said ratio tends to a considerable increase.

An object of the invention is to look for a stripper in which said $NH_3$ excess be removed as far as possible and in which said $NH_3:CO_2$ ratio be kept as near as possible to the optimum level; other objects will be evident from the description hereinafter.

DESCRIPTION OF THE INVENTION

In its most general form, the invention concerns a falling-film process and apparatus for the cocurrent evaporation of a solution, consisting of the use of a tube-bundle heat-exchanger, indirectly heated, e.g. by condensing steam, in which exchanger the feed distributor permits the solution to fall onto the uppermost tube sheet having pipes jutting out above said uppermost sheet by means of inlet sleeves (nipples) supplied with tangential distribution slots, characterized in that:

said sleeves are closed at their uppermost end, causing the released vapors to flow downwardly (cocurrent to the falling film);

said apparatus is provided with means (outside of the usual exchanging pipes) for the recycle of said released vapors from the bottom of the exchanger to a level higher than said uppermost end of the sleeves.

Said means can suitably consist of a recycle piping (wherethrough no liquid is flowing) protruding over said uppermost sheet more than the jutting out of said sleeves, said piping being void of distribution slots—in the protruding portion—for a length equal at least to the height of said sleeves, wherein said piping is supplied with at least one opening (for the outlet of the recycled vapors), said opening being at a level higher than said uppermost end of the sleeves.

Should said opening coincide with the uppermost mouth of the piping (see FIGS. 1, 2 3), it is necessary to surmount said mouth, e.g. by means of a small sloping roof, what prevents any liquid from entering the piping; should said recycle piping be unique, its size must be properly calculated, obviously in a different way with respect to the calculation of the falling-film exchanging pipes.

Alternatively said sole piping may be replaced, for instance, by a proper number of pipes having the same diameter of the falling-film pipes, provided that the jutting out of the sheet be sufficiently long and the position (height) of the slots be modified as already pointed out for said unique piping.

Figure 3:
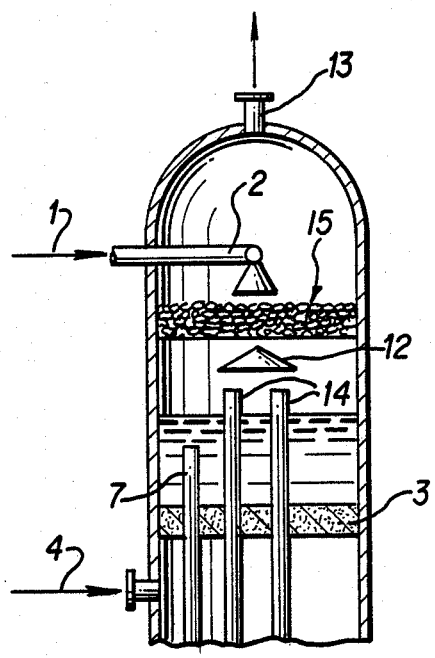
FIG. 3 is similar to FIG. 2 but illustrates a packing layer below a feed distributor.
Figure 4:
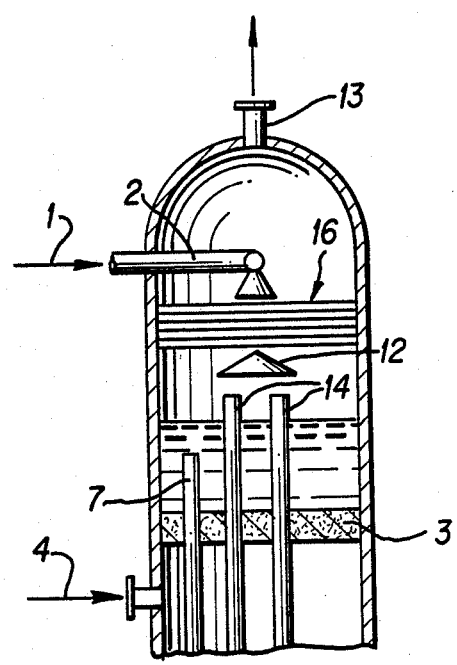
FIG. 4 is similar to FIG. 3 but illustrates a plurality of sieve trays in place of the packing layer of FIG. 2.

According to a particular embodiment, where urea solutions are to be dealt with, the invention comprises the step of providing, within the space lying between said feed distributor and the top of said sleeves, a packing layer (15) (FIG. 3) or sieve trays (16) (FIG. 4) or equivalent devices, in order to increase the distribution homogeneity of the falling liquid and the vapor-liquid interphase contact, whereby the $CO_2$ contained in said vapors is adiabatically absorbed by the $NH_2$-urea-carbamate solution (in amounts as near as possible to the equilibrium level) and whereby, consequently, the heat released by the $CO_2$ absorption gives rise to a further increase of the $NH_3$ removal from the liquid, the $NH_3/CO_2$ final ratio, within the solution, being thus further and considerably reduced. According to an alternative embodiment, the recycle piping may lie outside the stripper and outside may also be the arrangement of the packing layer or of other equivalent devices.

As a consequence of the process and apparatus according to the invention, the urea solutions are leaner in free $NH_3$ rather than in carbamate, that allows one to achieve considerable advantages, as pointed out clearly in Italian patent publication No. 22073 A/83. Further, the cocurrent run speeds up the displacement of $NH_3$ from the liquid (while lessening, contemporaneously, the carbamate decomposition) and provides for e.g. the following advantages:

simplification of the recycle of the non-reacted reactants ($NH_3$ and $CO_2$);

lowering of the $H_2O/CO_2$ ratio within the synthesis reactor, thus increasing the carbamate conversion into urea.

A further advantage of the apparatus according to the invention, in the case of an urea synthesis cycle of the I.D.R. type, resides in that it permits an easier, quicker and safer re-starting of the plant, when a non-scheduled halt does occur.

Until now we made reference to an $NH_3$ stripping in the absence of driving gas and at a pressure substantially equal to the synthesis pressure; our apparatus, however, can be advantageously used also for displacing $NH_3$ into the vapor phase when the pressure of the start solution is much lower than said synthesis pressure and the apparatus takes its most proper name according to a single case, like, for instance, "medium-pressure still", "low-pressure still" and so on.

Figure 1:
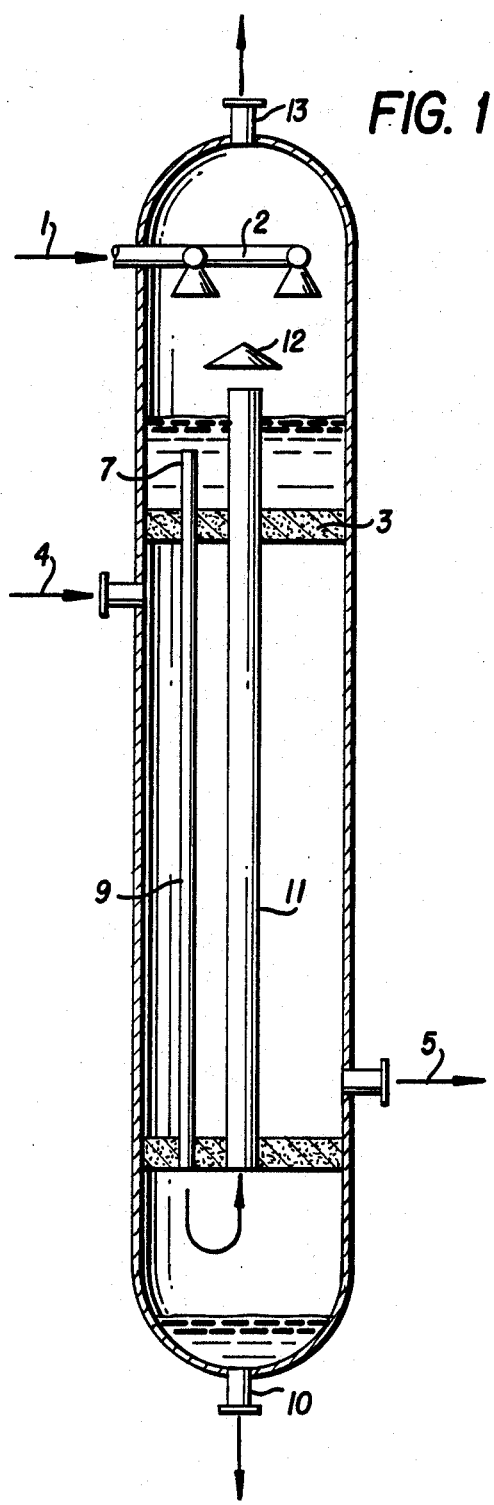
FIG. 1 is a schematic representation of the falling film apparatus of the present invention.
Figure 1A:
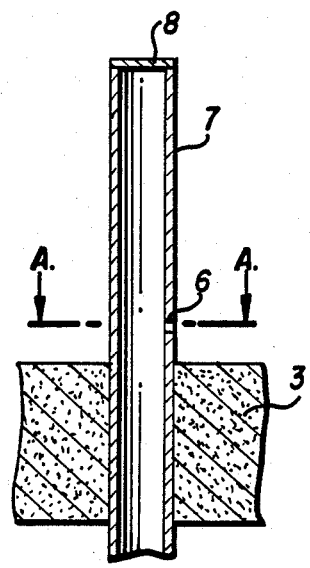
FIG. 1A is an enlarged view of the uppermost end of a sleeve 7 and a portion of tube sheet 3, as illustrated in FIG. 1.
Figure 1B:
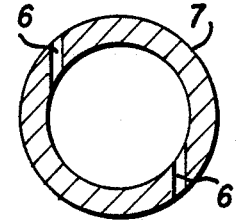
FIG. 1B is a top sectional view taken through line A—A of FIG. 1A.
Figure 2:
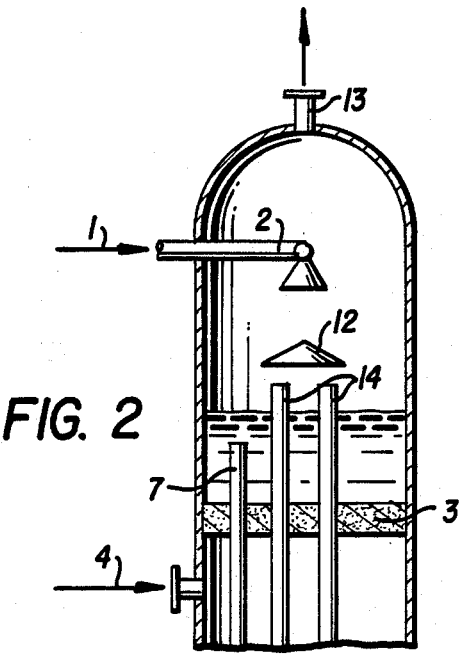
FIG. 2 is a further embodiment of the invention illustrating a limited number of individual pipes in place of central piping 11 of the embodiment shown in FIG. 1.

The apparatus according to the invention is illustrated also, as an example and in non-limitative form, by means of FIG. 1, according to which figure an aqueous area solution (1), having for instance the following features:

| | |
|---|---|
| $NH_3$ = 35.80% b.w. | Urea = 34.50% b.w. |
| $CO_2$ = 10.84% b.w. | T = 194° C. |
| $H_2O$ = 18.77% b.w. | P = 195 Kg/cm² (absolute) | falls, by means of a spray nozzle (2), onto the uppermost tube sheet (3) of a falling-film heat exchanger, heat by saturated steam (4) (at 25 Kg/cm², absolute) said steam being removed as condensate (5). The liquid forms a shallow heel and flows through the tangential distribution holes (6) in the side wall of the sleeves (7), jutting out of said sheet (see details in FIGS. 1A and 1B), said sleeves being closed, at their uppermost end, by a blind disk (8). The liquid heel can be maintained at a level higher than the highest distribution holes (6). This is shown in FIGS. 1 and 2.

A liquid film is thus formed on the inner wall of the pipes (9), which film flows downwardly in cocurrent to the gases (prevailingly $NH_3$, $CO_2$, $H_2O$) released during the falling. At the lowermost outlet of said pipes (9) the phases are sharply separated; the liquid forms a heel on the stripper (tapered) bottom and leaves the stripper through nozzle (10), while the vapors are recycled upwards by a central piping (11) surmounted by a chimney canopy (12) and leave the stripper through nozzle (13).

The central piping (11), as already said, can be obviously replaced by a suitable number of pipes (14) forming a tube-bundle, having a cumulative cross section equivalent to the cross section of piping (11), said pipes (14) being supplied with longer sleeves and being open topped and without holes for distributing the liquid (see FIG. 2), up to a height at least equal to the height of said sleeves or at least to the heel of the liquid feed.

What is claimed is:

1. In a method of stripping, at high pressures, a urea solution effluent of a high pressure reactor, said stripping being performed within a stripper apparatus comprising a vertical tube-bundle heat exchanger including a shell, an uppermost tube-sheet and a lower tube-sheet mounted within said shell so as to define a space between said uppermost and lower tube-sheets into which a heat exchange fluid is introduced, said tube-bundle including a plurality of pipes extending through said space and above said uppermost tube-sheet and opening below said lower tube-sheet, and a feed distribution means to form a liquid heel on said uppermost tube-sheet, the improvement consisting of closing the uppermost end of said pipes and providing said pipes with apertures in those portions of said pipes which extend above said uppermost tube-sheet, maintaining said liquid heel at a level higher than the highest of said apertures, introducing liquid from said liquid heel through said apertures into the interior of said pipes so as to cause co-current downward flow of both said liquid and any vapor released therefrom through said pipes to below said lower tube-sheet, and recycling said vapor from below said lower tube-sheet to above said liquid heel through conduit means distinct from said pipes.

2. The method of claim 1, including the step of tangentially introducing said liquid into said pipes.

3. The process of claim 1, wherein said recycling step recycles vapor from below a plurality of lower tube-sheet to above said liquid heel through said conduit means which is comprised of a plurality of individual pipes distinct from the pipes of said tube-bundle.

4. The method of claim 1, including the step of preventing the entry of liquid from said feed distribution means into said conduit by providing a sloping roof comprising a tapered canopy above said conduit.

5. The process of claim 1, including the step of withdrawing the vapor through an outlet means located above said distribution means.

6. The process of claim 1, lincluding the step of increasing the distribution homogeneity of the liquid forming said liquid heel.

7. The process of claim 6, wherein said step of increasing the distribution homogeneity comprises flowing the liquid through a packing layer.

8. The process of claim 6, wherein said step of increasing the distribution homogeneity comprises flowing the liquid through sieve trays.

9. The process of claim 1, including the step of discharging a stripped solution through an outlet located below said lower tube sheet.

* * * * *